United States Patent [19]

Sato et al.

[11] 4,425,442

[45] Jan. 10, 1984

[54] PROCESS FOR PRODUCING OPEN CELL FOAM AND FOAMABLE COMPOUND

[75] Inventors: Akira Sato, Tsuchiura; Tatsuo Waki, Tokyo, both of Japan

[73] Assignee: Lonseal Corporation, Tokyo, Japan

[21] Appl. No.: 441,675

[22] Filed: Nov. 15, 1982

Related U.S. Application Data

[62] Division of Ser. No. 211,443, Nov. 28, 1980, Pat. No. 4,381,962.

[30] Foreign Application Priority Data

Dec. 25, 1979 [JP] Japan .................................. 54-169998

[51] Int. Cl.$^3$ ................................................ C08J 9/10
[52] U.S. Cl. ............................................ 521/93; 521/73; 521/95; 521/145; 521/909
[58] Field of Search ...................... 521/73, 93, 95, 145, 521/909

[56] References Cited

U.S. PATENT DOCUMENTS

| | | | |
|---|---|---|---|
| 2,964,799 | 12/1960 | Ruggi et al. | 264/175 X |
| 3,145,241 | 8/1964 | Powell | 264/175 X |
| 3,173,978 | 3/1965 | Olson et al. | 264/DIG. 60 |
| 3,536,638 | 10/1980 | Dosmann | 260/2.5 |
| 4,124,431 | 11/1978 | Schramer et al. | 264/175 X |
| 4,226,943 | 10/1980 | Tsurushige et al. | 521/73 |

FOREIGN PATENT DOCUMENTS

| | | | |
|---|---|---|---|
| 718826 | 9/1965 | Canada | 264/DIG. 60 |
| 5321898 | 2/1978 | Japan . | |
| 1195867 | 6/1970 | United Kingdom | 264/DIG. 60 |

OTHER PUBLICATIONS

Dilley, E. R., "The Use of Chemical Blowing Agents in Direct Extrusion Expansion," in *Trans. J. Plastics Inst.*, Feb. 1966, pp. 17-20.

*Primary Examiner*—Morton Foelak
*Attorney, Agent, or Firm*—Sandler & Greenblum

[57] ABSTRACT

A process for producing an open cell foam comprising the steps of:

(a) forming a compound comprising polyvinyl chloride resin produced by suspension polymerization, at least one organic stabilizer containing at least one Group I metal and at least one organic stabilizer containing at least one Group II metal, at least one surface active agent, and a heat decomposable blowing agent; and (b) heating the compound to decompose the blowing agent thereby producing the foam.

A foamable compound comprising polyvinyl chloride resin produced by suspension polymerization, at least one organic stabilizer containing at least one Group I metal and at least one organic stabilizer containing at least one Group II metal, at least one surface active agent, and a heat decomposable blowing agent.

The foam formed exhibits high breathability as well as a high water permeability when desired.

5 Claims, No Drawings

PROCESS FOR PRODUCING OPEN CELL FOAM AND FOAMABLE COMPOUND

This is a division of application Ser. No. 211,443 filed November 28, 1980.

BACKGROUND OF THE INVENTION

1. Field of the Invention

The invention relates to a process for producing an open cell foam of flexible polyvinyl chloride resin.

2. Description of Prior Art

Flexible polyvinyl chloride resin foams have previously been produced from general-purpose polyvinyl chloride, formed by suspension polymerization, in combination with a heat decomposable blowing agent such as azodicarbonamide. Such foams are of the closed cell type and it has been impossible, when using such a resin to obtain an open cell foam of the polyurethene foam type which exhibits substantial breathability and water permeability.

Open cell polyvinyl chloride foams can be obtained from plastisols produced from Polyvinyl chloride, formed by emulsion polymerization. The plastisol is used as a starting material in combination with a blowing agent particularly adapted for use with plastisols such as AZ-F (azodicarbonamide powder dispersed in paraffin) made by OTSUKA YAKUHIN K.K. as well as with a mixture of azodicarbonamide and vaseline.

While open cell foams can be obtained when using such plastisols in combination with specially selected blowing agents, open cell foams cannot be obtained when using azodicarbonamide alone. Additionally, blowing agents developed for use with plastisols cannot be applied to polyvinyl chloride produced by suspension polymerization for the following reasons:

1. It is very difficult to knead compounds containing such blowing agents.
2. Even if compounds containing such blowing agents could be kneaded, they could not be used to form a sheet because compound exhibits high lubricancy because of the presence of vaseline and paraffin.
3. Using such blowing agents insufficient gellation is achieved.
4. Dispersion of such blowing agents is so poor that uniform open cell foams cannot be obtained.

Furthermore, open cell foams produced by plastisols in "liquid phase coating techniques" including the doctor-blade process and the reverse roll coater process are poor in efficiency and high in material and operating costs as compared with foams which are produced by calendering.

There is, therefore, a demand for a process for producing open cell foams by calendering techniques. Yet, thus far no practical process for forming open cell foams by calendering is available.

SUMMARY OF THE INVENTION

It is, therefore, an object of the invention to provide a process for producing an open cell foam out of polyvinyl chloride produced by suspension polymerization.

It is a further object of the invention to provide a process for producing open cell foams by calendering, and particularly to provide a process in which calendering is used to form an open cell foam of polyvinyl chloride which has itself been made by suspension polymerization.

These and other objects of the invention are achieved by means of the process of the invention in which an open cell foam is produced out of a polyvinyl chloride resin produced by suspension polymerization. According to the invention, a compound comprising a major ingredient of general purpose polyvinyl chloride resin which has been produced by suspension polymerization is formulated so as to include in combination at least one organic stabilizer containing metals from each of Groups I and II of the periodic table, or at least one complex organic stabilizer containing both Group I and Group II metals. The compound further comprises at least one surface active agent in combination with the organic stabilizer, a plasticizer and a heat decomposable blowing agent.

The compound itself further constitutes one aspect of the invention.

The compound of materials listed above, together with other additives and fillers if desired, may be formed into a sheet which may then be heated, e.g., in an oven, so as to cause foaming of the sheet.

The compound may be formed into a sheet by either calendering or extrusion. Thus, the process of the invention permits the use of calendering techniques, which, as has been noted above, result in increased efficiency and reduced costs.

According to a particularly advantageous embodiment of the invention, the blowing agent used may be azodicarbonamide which has normally previously been used for the production of closed cell foams.

By virtue of the process of the invention, open cell foams are produced having outstanding breathability as well as additionally exhibiting water permeability depending upon the situation. It is a significant advantage of the invention that such an open cell foam may be formed out of a compound which comprises mainly general purpose polyvinyl chloride resin which has been formed by suspension polymerization.

DESCRIPTION OF PREFERRED EMBODIMENTS

As was noted above, the invention relates to a process for producing an open cell foam out of a general purpose polyvinyl chloride resin produced by suspension polymerization.

According to the process, a compound comprising a major portion of general purpose polyvinyl chloride resin produced by suspension polymerization and a relatively small quantity of additional components including:

(a) at least one Group I metal organic stabilizer in combination with at least one organic stabilizer containing a Group II metal; or (b) a complex organic stabilizer comprising both Group I and Group II metals in combination with a surface active agent. Additionally, a plasticizer, and a heat decomposable blowing agent such as azodicarbonamide, usually used in the production of closed cell foams may be added. Further conventional additives and fillers may be added as required.

The compound of materials formed is then preferably heated and mixed and then formed into a sheet. It is an advantage of the invention that the sheet may be formed by calendering, i.e., passing the compound between rollers, e.g., two or four rollers, to form a sheet since such techniques have proven more efficient and economical. Nevertheless, the sheet may alternatively be formed by extruding the heated and mixed compound into a sheet.

The sheet is then passed through an oven so as to heat the sheet such that it foams by virtue of the decomposition of the blowing agent.

According to a preferred embodiment of the invention, the Group I metal containing organic stabilizer preferably comprises Na and/or K while the Group II metal containing organic stabilizer preferably comprises Zn and/or Ca.

It is important that the organic stabilizers be used in combination with a surface active agent. The surface active agent is either:

(a) a combination of an anionic surfactant and a nonanionic surfactant;

(b) a combination of an anionic surfactant with a low molecular weight polyolefin; or (c) a combination of an anionic surfactant with a wax. The term wax is taken to include:
 (1) paraffins such as vaseline, and liquid paraffin;
 (2) higher alcohols such as stearyl alcohol;
 (3) higher fatty acids such as stearic acid;
 (4) higher fatty acid amides such as ethylene bis steoroamide;
 (5) higher alkyl radical compounds;
 (6) ester waxes such as carnuaba wax; and
 (7) mixtures of the above materials.

The "polyvinyl chloride resin" formed by suspension polymerization used in formulating the compound of the invention which is ultimately sheeted and foamed, is taken to include a resins which consist only of vinyl chloride copolymer; those comprising a blend of vinyl chloride copolymer and vinyl chloride homopolymer; and those consisting of vinyl chloride homopolymer. Thus, it is within the scope of the invention to use copolymers such as vinyl chloride-vinyl acetate copolymer, vinyl chloride-ethylene copolymer, vinyl chloride-maleic acid copolymer and blends of vinyl chloride homopolymer with vinyl chloride copolymers of the types mentioned as well as others. Particularly good results are obtained when using vinyl chloride-vinyl acetate copolymer in a blend with vinyl chloride homopolymer.

The term "polyvinyl chloride resin" extends further, while still falling within the scope of the invention, so as to include vinyl chloride homopolymer and copolymers which has been modified with polymethyl methacrylate EVA, NBR, etc.

The polyvinyl chloride resin suitable for use in the process of the invention should preferably have a polymerization degree 400 to 1300 and most preferrably a polymerization degree of 600 to 1000. Such a range exists because the composition comprises a blowing agent as is the case in the production of foams formed from ordinary flexible polyvinyl chloride.

Although the above ranges are preferred, these ranges should not be construed as limiting the scope of the invention. Thus, polyvinyl chloride having a polymerization degree of 400 may be blended with polyvinyl chloride having a polymerization degree of 1350 in a 1:1 ratio. Such a blend gives improved results in processability and performance of open cell foams when compared with polyvinyl chloride resin used alone having a polymerization degree of 800. It may thus be preferable to use a combination of materials so as to achieve better results.

The organic stabilizer forms an extremely important component of the compound. The organic stabilizer may in fact comprise two or more separate organic stabilizers at least one of which is selected from Group I metal compounds while at least one other organic stabilizer is selected from Group II metal compounds. The organic stabilizers are used in combination. Alternatively, or in combination with the previous combination, the organic stabilizer is selected from the group consisting of complex metal organic stabilizers wherein the stabilizer comprises at least one Group I metal and at least one Group II metal.

The term "organic" stabilizer is used herein to denote salts of the above metals and fatty acids such as ricinoleic acid, decanoic acid, lauric acid, stearic acid, octoic acid, and 2-ethylhexoic acid. Salts of the above metals and aromatic carboxylic acids, heterocyclic carboxylic acids, phenols, and unsaturated fatty acids such as maleic acid having a double bond in the molecule are also intended.

Among the Group I metals contemplated by the invention, are Li, Na and K, although Na and/or K are most preferably used. The Group II metals intended by the invention include Mg, Ca, Zn, Sr, Cd and Ba, although Zn and/or Ca are most preferably used. The metals of Group I and II may comprise only one metal selected from each Group or a combination of metals selected from each Group.

At least one organic stabilizer(s) from each Group is used in combination with at least one stabilizer of the other group. In one combination, sodium octoate is the Group I metal organic stabilizer while zinc stearate is the Group II organic metal stabilizer. In another combination, a plurality of distinct Group I metal organic stabilizers are used in combination with a Group II organic stabilizer comprising only a single Group II metal, while an opposite combination may likewise be used.

Quite obviously, the individual stabilizers may be dissolved together with adjuvants in an appropriate solvent prior to use without departing from the scope of the invention.

Besides combinations of distinct Group I and Group II organic stabilizers, recently available liquid "complex stabilizers" such as those comprising organic acid salts, solvents, and an organic phosphite ester adjuvant may be used. In such stabilizers, the organic stabilizer is not a combination of distinct compounds but rather a complex stabilizer containing both a Group I and Group II metal. Commercially available complex stabilizers are sold under the tradename MARK FL-22 and FL-23 made by ADEKA ARGUS K.K. Such stabilizers contain a Group I metal in the form of sodium and a mixture of Group II metals comprising zinc and calcium. Since these complex organic stabilizers already contain both Group I and Group II metals in combination, FL-22, for example may be used alone.

Stabilizers are used in amounts of about 1 to 5 phr and most preferably in amounts of about 2 to 4 phr.

According to the invention, the surface active agent is as important as the stabilizer. The surface active agent should preferably comprise both anionic and nonionic surface active agents used in combination. Anionic or nonionic surface active agents used alone will not generally result in a satisfactory open cell structure. It is the use of the two types of surface active agents, used in combination which results in the desired product and which must be used. Although an anionic surface active agent should be used as part of the combination, the nonionic surface active agent may be replaced by a low molecular weight polyolefin or by waxes.

According to the invention anionic surface active agents which may be used include: salts of higher fatty acids, salts of secondary higher fatty acids, salts of higher alkyl dicarboxylic acids, sulfates of primary higher alcohols, sulfates of secondary higher alcohols, salts of primary alkylsulfonic acids, salts of secondary alkylsulfonic acids, salts of higher alkyldisulfonic acids, salts of sulfated fats and fatty acids, salts of sulfonated higher fatty acids, higher alkyl phosphate esters, sulfates of higher fatty acid esters, sulfonates of higher fatty acid esters, sulfates of higher alcohol esters, sulfonates of higher alcohol esters, condensates of higher fatty acids and amino acids, alkylsulfates of higher fatty acid amides, alkylsulfonates of higher fatty acid amides, alkylcarboxylates of higher alkylsulfonamide, esters of sulfosuccinic acid, alkylbenzene sulfonates, alkylphenol sulfonates, alkylnaphthalene sulfonates, formalin condensates of alkylnaphthalene sulfonate, alkyldiphenyl or alkylpolyphenyl sulfonates, ketones of alkylaryl sulfonates, and petroleum sulfonates.

Anionic surface agents are used in amounts of about 1 to 5 phr and most preferably about 2 to 3 phr.

The nonionic surface active agents include polyoxyethylene alkyl ethers, polyoxyethylene alkylaryl ethers, polyoxyethylene esters of fatty acids, oxyethylene-oxypropylene block polymers, glycerine esters of fatty acids, glycol esters of fatty acids, pentaerythritol esters of fatty acids, sugar esters of fatty acids, sorbitan and mannitan esters of fatty acids, higher alcohol condensates, higher fatty acid condensates, higher alkyl amine condensates, higher fatty acid amide condensates, higher alkyl mercaptan condensates, alkylphenol condensates, and polypropylene oxide condensates.

The nonionic surface active agent is preferably used in amounts of about 0.1 to 3 phr and most preferably about 0.5 to 1.5 phr.

According to one embodiment of the invention, which has proven very effective for producing open cell foams, LIPOLAN 1400 (alpha-olefin sulfonate) made by LION FAT & OIL CO., Ltd is used as the anionic surface active agent while LIPONOX NC-2Y (polyoxyethylene alkylaryl ether) is used.

As was noted previously, the nonionic surface active agent may be replaced by a low molecular weight polyolefin. Thus, according to the invention, liquid polypropylene and low molecular weight polyethylene may be used instead of nonionic surface active agents. Liquid polypropylene which may be used according to the invention is exemplified by LPP-N108 made by UBE INDUSTRIES Ltd. while a low molecular weight polyethylene which may used is exemplified by FLO-THENE made by SIETETSU KAGAKU Co., Ltd.

The low molecular weight polyolefin is used in amounts of about 0.1 to 3.0 phr and most preferably about 0.5 to 1.5 phr.

According to yet another embodiment of the invention, the nonionic surface active agent is replaced by a wax for use in combination with the anionic surface active agent. Examples of waxes which may be used are NISSEKI MICROWAX 155 and 180 made by NIPPON OIL Co., Ltd.

The wax may be used in amounts which preferably range from about 0.1 to 3.0 phr and most preferably about 0.5 to 1.5 phr.

It has been found that substitution of either the low molecular weight polyolefin material or the wax for the nonionic surface active agent has proven as effective as the use of nonionic surface active agents to produce highly desireable outstanding open cell foams.

Plasticizers, such as those which are commonly used with polyvinyl chloride resins produced by suspension polymerization and emulsion polymerization may be added to the compound of the invention. The plasticizers may include, but are not limited to: derivatives of phthalic acid such as diisodecyl phthalate; derivatives of phosphoric acid such as tricresyl phosphate; derivatives of adipic acid such as dioctyl adipate and diisodecyl adipate; derivatives of azelaic acid such as dioctyl azelate; derivatives of benzoic acid such as diethylene glyco dibenzoate; epoxy plasticizer; derivatives of citric acid such as tributyl citrate; derivatives of sebacic acid such as dioctyl sebacate; derivatives of trimellitic acid such as trioctyl trimellitate; derivatives of sulfonic acid; fatty acid esters; glycerine derivatives; chlorinated paraffins; chlorinated diphenyls; derivatives of pyromellitic acid; and polyester plasticizers. Rubbery plasticizers such as EVA and NBR are also effective as foam stabilizers.

The addition of blowing agent is an important aspect of the invention. Heat decomposable blowing agents which are commonly used for the production of closed cell foams can be used satisfactorily in this invention. The heat decomposable blowing agents include, but are not limited to, azodicarbonamide, dinitrosopentamethylenetetramine, p-toluenesulfonyl hydrazide, and 4,4'-oxybis(benzene sulfonyl hydrozide). Azodicarbonamide is particularly preferred.

The blowing agent is added in amounts of about 1 to 8 phr and most preferably about 2 to 6 phr.

The heat decomposable blowing agents listed are commonly used for the production of PVC sponge leather. While these blowing agents normally give closed cell foams when used in conjunction with polyvinyl chloride produced by suspension polymerization, the same compounds, surprisingly, result in an open cell structure when used in combination with the same polyvinyl chloride produced by suspension polymerization when the stabilizer-surface active agent combination of the invention is used.

As was noted previously, the composition of the process may further contain fillers such as calcium carbonate powder and additives such as metal oxides such as zinc oxide which adjust the decomposition temperature of the blowing agent.

In performing the process of the invention, the various ingredients may be weighed or metered as desired and then mixed in a Henschel mixer or the like. The resulting composition is powdery although slightly wet, and does not stick to the mixing chamber, unlike compositions based upon emulsion polymerized polyvinyl chloride. The composition can, therefore, be readily fed to an intensive mixer. The mixing in the Henschel mixer occurs at about 50°–60° C. so as to promote the absorption of the plasticizer into the resin particles. The stabilizer, as well as the other ingredients used, are well dispersed in the resulting flowable mixture.

The compound mixture is then fed to an intensive mixer where it is heated and gelled under pressure. The heating temperature is regulated to about 100°–110° C. Mixing at excessively high temperatures should be avoided since this will result in premature decomposition of the blowing agent by virtue of the fact that the composition contains a Group I metal. These conditions apply when mixing with a mixing roll which mixing should be performed at about 130° C.

The compound thus mixed is subsequently subjected to rolling by a calender roller maintained at about 5°–10° C. higher than the mixing roller. The calendered sheet may vary in thickness from about 0.2 to 0.4 mm. depending upon the blowing ratio as well the desired thickness of the end product.

The rolled sheet is then laminated onto a paper or cloth substrate. Until this stage, with the exception of the unique formulation of ingredients, the process steps are generally the same as for the production of conventional sheet foam or leather, with the further exception of the stringent temperature limitations which must be observed. No special additional equipment is required.

Although it is an advantage of the invention that the compound formulation may be calendered so as to form a sheet, the compound may alternatively be sheeted by extrusion in which case the compound in tape or belt form is discharged from the mixing roll and fed to an extruder. The powdered mixture is pelletized and the pellets are processed into a sheet. Alternatively, the powdered mixture may be directly extruded into a sheet.

The plasticizer used in the formulation will very substantially affect the flexibility of the resulting foam. The plasticizer is added in amounts of from about 20–25 phr to form semi rigid foams while it is added in amounts of from about 40–80 parts per hundred resin so as to form flexible foams. If substantially less than about 20 parts per hundred resin of plasticizer is used, it is difficult to obtain open cell foam in sheet form. It should be noted that when using relatively little plasticizer so as to form a rigid foam formulation, the extrusion is suitable for the extrusion of pipes and other shapes having an open cell structure.

After having laminated the sheet onto a backing or substrate, the semi-finished product is passed through an oven in which the sheet readily foams so as to form a leather-like product having outstanding breathability and moisture permeability. A final sheet having an open cell foam having outstanding breathability and moisture permeability with no backing can be obtained if the backing substrate used is a release paper which can then be removed after foaming.

It has been surprisingly found that the open cell foam obtained according to the process of this invention has ten times the breathability of conventional breathable leather such as is formed by the heat perforation method. According to this method the leather is pierced by heat needles with about 20–50 needles per square centimeter. The open cell foam of this invention also exhibits outstanding moisture permeability. Water drops placed on the surface of the foam are instantaneously absorbed and permeate throughout the foam layer.

The open cell foam laminated onto a backing cloth is useful as an upholstery material for automotive seats and barber chairs. Open cell foams laminated onto a backing paper may be used as wall paper, which serves to prevent dew condensation because of its heat insulating properties, its moisture absorption and its water permeability. Furthermore, because of the thermoplasticity of the foam, the formulation of the sheet of the invention may be embossed so as to form any desired design or pattern. When used in upholstry and seat covering, the foam sheet may require surface treatment for reinforcement. So as to preserve breathability and moisture permeability, a gravure coater that applies the surface treating agent in the form of tiny spots is recommended.

EXAMPLES

The invention will now be described by way of example.

EXAMPLES 1–11

Foam leather is produced from 11 compositions as illustrated in Table 1. In each case the weighed ingredients are mixed in a stainless steel bowl and then mixed on a test roll at 140° C. for 10 minutes. The stock is then formed into a sheet of 0.35 mm thickness and the sheet is immediately laminated onto a substrate of spun rayon muslin No. 4. The laminate is placed in an oven so as to foam at 210° C. Foam leather of 1.6 mm thickness is obtained. The breathability and water permeability of the foam leather are shown in Table 1.

For purposes of comparison, the procedure of Examples 1–11 is repeated except that the stabilizer used is replaced by MARK -15 (made by ADEKA ARGUS) whose composition is not within the scope of the invention. The resulting foam leather exhibits substantially no breathability nor water permeability.

EXAMPLES 12–32

Foam leather is produced from 21 different compositions as shown in Table 2. The polyvinyl chloride, plasticizer and blowing agent are the same for all compositions. Once again, the procedure of examples 1–11 is repeated. The breathability and water permeability of the resulting leather are shown in Table II.

Upon repeating examples 12–32 under the same conditions except that the sodium salt stabilizer is replaced with a barium salt stabilizer and by replacing the potassium salt stabilizer with a cadmium salt stabilizer, whereby the formulation included only Group II organic stabilizers, the resulting foam leather exhibits substantially no breathability nor water permeability.

Analysis of Examples 1–11 as well as the corresponding comparative examples, would indicate that the type of polyvinyl chloride used has substantially no effect on the performance of the resulting foam leather as long as the composition contains an organic stabilizer containing a Group I metal, an organic stabilizer containing a Group II metal and a surface active agent all blended into the formulation. Examples 12–32, as well as the corresponding comparative examples, indicate that the kind of organic acid moiety of the stabilizer containing the Group I and Group II metals has little effect on the performance of the resulting foam leather. Also, it is seen that compositions wherein the nonionic surface active agent is replaced by low molecular weight polyethylene or wax result in foam leather having only slightly poorer water permeability, such not being a problem in most applications.

Finally, it is noted that when conventional stabilizers containing barium and cadmium salts are used, the result is a foam leather having substantially no breathability nor water permeability, even though the stabilizer is used in combination with a surface active agent.

Thus, it is apparent that the process of the invention makes it possible to produce an open cell foam which could not previously be formed by calendering in the past.

Although the invention has been described with respect to particular additives, fillers and plasticizers, it is to be understood that the invention is not limited to this extent and includes all processes including equivalent materials, the scope of the invention to be construed as limited only by the claims.

TABLE 1

| Examples | 1 | 2 | 3 | 4 | 5 | 6 | 7 | 8 | 9 | 10 | 11 |
|---|---|---|---|---|---|---|---|---|---|---|---|
| Ingredients | | | | | | | | | | | |
| Polyvinyl chloride (produced by suspension polymerization) | | | | | | | | | | | |
| Sumilit SX-8(*1) | 100 | | | | | | | | | | |
| Sumilit SX-13(*1) | | 100 | | | | | | | | | |
| Nissan Vinyl H-1000(*2) | | | 100 | 50 | | | | | | | |
| Nissan Vinyl E-800(*2) | | | | 50 | | | | | | | |
| Ryulon 800 BLT(*3) | | | | | 100 | | | | | | |
| Ryulon 700 DT(*3) | | | | | | 100 | | | | | |
| Nipolit SL(*4) | | | | | | | 100 | | | | |
| Nipolit SM(*4) | | | | | | | | 100 | | | |
| Kureha S-9008(*5) | | | | | | | | | 100 | | |
| Kureha S-901(*5) | | | | | | | | | | 100 | |
| Geon 103 EP(*6) | | | | | | | | | | | 100 |
| Plasticizer | | | | | | | | | | | |
| DOP | 65 | 70 | 70 | 55 | 65 | 70 | 65 | 70 | 65 | 70 | 65 |
| Epoxidized soybean oil | 5 | 5 | 5 | 5 | 5 | 5 | 5 | 5 | 5 | 5 | 5 |
| Blowing agent | | | | | | | | | | | |
| Azodicarbonamide | 6 | 6 | 6 | 6 | 6 | 6 | 6 | 6 | 6 | 6 | 6 |
| Surface active agent | | | | | | | | | | | |
| Lipolan 1400(*7) | 2.0 | 2.0 | 2.0 | 2.0 | 2.0 | 2.0 | 2.0 | 2.0 | 2.0 | 2.0 | 2.0 |
| Liponox NC-2Y(*7) | 0.5 | 0.5 | | 0.5 | | 0.5 | | | 0.5 | | 0.5 |
| Replacement | | | | | | | | | | | |
| Flothene UF 1.5(*8) | | | 1.0 | | | | 1.0 | | | 1.0 | |
| Nisseki Microwax 155(*9) | | | | | 0.5 | | | 0.5 | | | |
| Stabilizer | | | | | | | | | | | |
| Mark FL-22(*10) | 4 | | 4 | | 4 | | 4 | | 4 | | 4 |
| Mark FL-23(*10) | | 4 | | 4 | | 4 | | 4 | | 4 | |
| Performance | | | | | | | | | | | |
| Breathability (cc/cm²/sec)(*11) | 6 | 3 | 6 | 5 | 6 | 4 | 4 | 8 | 7 | 5 | 7 |
| Water permeability(*12) | 8 | 7 | 13 | 8 | 14 | 10 | 10 | 14 | 7 | 12 | 8 |

Remarks:
(*1)made by Sumitomo Chemical; SX-8: $\overline{P}$800 SX-13: $\overline{P}$1300
(*2)made by Nissan Chemical; H-1000: P1000 E-800: vinyl chloride-ethylene copolymer $\overline{P}$800
(*3)made by Toyo Soda; 800 BLT: $\overline{P}$800 700 DT: P1020
(*4)made by Chisso; SM: P1300 SL: P1020
(*5)made by Kureha Chemical; S-9008: $\overline{P}$800 S-901: $\overline{P}$1000
(*6)made by Japanese Geon; 103 EP: P1000
(*7)made by Lion Fat and Oil; Lipolan 1400: anionic surfactant (α-olefin sulfonate) Liponox NC-2Y: nonionic surfactant (polyoxyethylene alkylaryl ether)
(*8)made by Seitetsu Chemical: Flothene UF-1.5: low molecular weight polyethylene
(*9)made by Nippon Oil; Nisseki Microwax (MP: 70° C.)
(*10)made by Adeka Argus; FL-22 contains Na (1%), Ca, and Zn. FL-23 contains Na (2%) and Zn.
(*11)breathability test according to the automotive industry standards.
(*12)Time for 1 cc solution (prepared by diluting 10 cc of blue ink [made by Pilot Ink] with 100 cc of distilled water) to permeate from the front surface to the back surface of the foam sheet when the solution is placed on the front surface. For specimens with poor water permeability, the solution placed on the front surface is blotted with a piece of filter paper one minute later and the trace of the solution is checked.

TABLE 2

| Examples | 12 | 13 | 14 | 15 | 16 | 17 | 18 | 19 | 20 | 21 | 22 |
|---|---|---|---|---|---|---|---|---|---|---|---|
| Ingredient | | | | | | | | | | | |
| Polyvinyl chloride Nipolit SL | 100 | 100 | 100 | 100 | 100 | 100 | 100 | 100 | 100 | 100 | 100 |
| Plasticizer | | | | | | | | | | | |
| DOP | 55 | 55 | 55 | 55 | 55 | 55 | 55 | 55 | 55 | 55 | 55 |
| Epoxidezed soybean oil | 5 | 5 | 5 | 5 | 5 | 5 | 5 | 5 | 5 | 5 | 5 |
| Foam stabilizer | | | | | | | | | | | |
| Soabrene CI(*1) | | 10 | 10 | | | 10 | | | 10 | | 10 |
| NBR(*2) | 10 | | | 10 | 10 | | 10 | 10 | | 10 | |
| Blowing agent | | | | | | | | | | | |
| Azodicarbonamide | 6 | 6 | 6 | 6 | 6 | 6 | 6 | 6 | 6 | 6 | 6 |
| Surface active agent | | | | | | | | | | | |
| Lipolan 1400 | 2.0 | 2.0 | 2.0 | 2.0 | 2.0 | 2.0 | 2.0 | 2.0 | 2.0 | 2.0 | 2.0 |
| Liponox NC-2Y | 0.5 | | | 0.5 | | 0.5 | | 0.5 | 0.5 | | 0.5 |
| Replacement | | | | | | | | | | | |
| Flothene UF 1.5 | | 1.0 | 1.0 | | | | 1.0 | | | | |
| Nisseki Microwax | | | | | 1.0 | | | | | 1.0 | |
| Group I metal stabilizer | | | | | | | | | | | |
| Na octoate | 0.5 | 0.5 | | | | | | | | | |
| Na laurate | | | 0.5 | 0.5 | | | | | | | |
| Na stearate | | | | | 0.5 | 0.5 | | | | | |
| Na benzoate | | | | | | | 0.5 | 0.5 | | | |
| K laurate | | | | | | | | | 0.5 | 0.5 | |

TABLE 2-continued

| | | | | | | | | | | |
|---|---|---|---|---|---|---|---|---|---|---|
| K stearate | | | | | | | | | | 0.5 |
| K benzoate | | | | | | | | | | |
| Group II metal stabilizer | | | | | | | | | | |
| Zn octoate | 2.5 | | 2.5 | | 2.5 | | 2.5 | 2.5 | | 2.5 |
| Zn stearate | | 2.5 | | 2.5 | | 2.5 | | | 2.5 | |
| Ca octoate | | | | | | | | | | |
| Ca stearate | | | | | | | | | | |
| Performance | | | | | | | | | | |
| Breathability | 6 | 8 | 7 | 5 | 7 | 7 | 4 | 8 | 7 | 5 | 7 |
| Water permeability | 6 | 7 | 9 | 4 | 7 | 5 | 10 | 6 | 3 | 9 | 4 |

| Examples | 23 | 24 | 25 | 26 | 27 | 28 | 29 | 30 | 31 | 32 |
|---|---|---|---|---|---|---|---|---|---|---|
| Ingredient | | | | | | | | | | |
| Polyvinyl chloride | 100 | 100 | 100 | 100 | 100 | 100 | 100 | 100 | 100 | 100 |
| Nipolit SL | | | | | | | | | | |
| Plasticizer | | | | | | | | | | |
| DOP | 55 | 55 | 55 | 55 | 55 | 55 | 55 | 55 | 55 | 55 |
| Epoxidized soybean oil | 5 | 5 | 5 | 5 | 5 | 5 | 5 | 5 | 5 | 5 |
| Foam stabilizer | | | | | | | | | | |
| Soabrene CI(*1) | | 10 | 10 | | | 10 | 10 | | 10 | 10 |
| NBR(*2) | 10 | | | 10 | 10 | | | 10 | | |
| Blowing agent | | | | | | | | | | |
| Azodicarbonamide | 6 | 6 | 6 | 6 | 6 | 6 | 6 | 6 | 6 | 6 |
| Surface active agent | | | | | | | | | | |
| Lipolan 1400 | 2.0 | 2.0 | 2.0 | 2.0 | 2.0 | 2.0 | 2.0 | 2.0 | 2.0 | 2.0 |
| Liponox NC-2Y | | 0.5 | | 0.5 | 0.5 | 0.5 | 0.5 | 0.5 | 0.5 | 0.5 |
| Replacement | | | | | | | | | | |
| Flothene UF 1.5 | 1.0 | | | | | | | | | |
| Nisseki Microwax | | | 1.0 | | | | | | | |
| Group I metal stabilizer | | | | | | | | | | |
| Na octoate | | | | 0.5 | | | | | | |
| Na laurate | | | | | 0.5 | | | | | |
| Na stearate | | | | | | 0.5 | | | | |
| Na benzoate | | | | | | | 0.5 | | | |
| K laurate | | | | | | | | 0.5 | | |
| K stearate | 0.5 | | | | | | | | 0.5 | |
| K benzoate | | 0.5 | 0.5 | | | | | | | |
| Group II metal stabilizer | | | | | | | | | | |
| Zn octoate | | 2.5 | | | | | | | | |
| Zn stearate | 2.5 | | 2.5 | | | | | | | |
| Ca octoate | | | | 2.5 | | 2.5 | | 2.5 | | 2.5 |
| Ca stearate | | | | | 2.5 | | 2.5 | | 2.5 | |
| Performance | | | | | | | | | | |
| Breathability | 6 | 8 | 6 | 5 | 5 | 7 | 7 | 6 | 8 | 7 |
| Water permeability | 7 | 5 | 8 | 5 | 4 | 6 | 4 | 5 | 3 | 3 |

Remarks:
(*1)EVA containing more 60% of vinyl acetate (made by Nippon Synthetic Chemical Industry)
(*2)NBR 10% DOP solution (made by Kyowa Hakko Kogyo)

What is claimed is:
1. A foamable composition for making an open-celled foam compound comprising:
   (a) polyvinyl chloride resin produced by suspension polymerization;
   (b) at least one organic stabilizer containing at least one Group I metal and at least one organic stabilizer containing at least one Group II metal;
   (c) at least one anionic surface active agent; and
   (d) a heat decomposable blowing agent.
2. The foamable composition as defined by claim 1 wherein said heat decomposable blowing agent is azodicarbonamide.
3. The foamable composition as defined by claim 2 wherein said Group I metal is selected from the group consisting of sodium, potassium, or mixtures thereof, and said Group II metal is selected from the group consisting of zinc, calcium, or mixtures thereof.
4. The foamable composition as defined by claim 3 wherein said at least one organic stabilizer is a complex organic stabilizer comprising at least one of each of said Group I and II metals.
5. The foamable composition as defined by claim 1 further comprising a member selected from the group consisting of: a nonionic surface active agent; a low molecular weight polyolefin; a wax; or mixtures thereof.

* * * * *

UNITED STATES PATENT AND TRADEMARK OFFICE
CERTIFICATE OF CORRECTION

PATENT NO. : 4,425, 442

DATED : January 10, 1984

INVENTOR(S) : Akira SATO et al.

It is certified that error appears in the above-identified patent and that said Letters Patent is hereby corrected as shown below:

Item [56], on the face sheet, in the U.S. Patent Documents, delete "Ruggi" and substitute ---Roggi---

Item [56], on the face sheet, in the U.S. Patent Documents, delete "10/1984" and substitute ---10/1970---

Signed and Sealed this

Second Day of April 1985

[SEAL]

*Attest:*

DONALD J. QUIGG

*Attesting Officer*     *Acting Commissioner of Patents and Trademarks*